United States Patent
Hori

(10) Patent No.: US 7,297,436 B2
(45) Date of Patent: Nov. 20, 2007

(54) FUEL CELL

(75) Inventor: Yuuichi Hori, Kokubu (JP)

(73) Assignee: Kyocera Corporation, Kyoto (JP)

( * ) Notice: Subject to any disclaimer, the term of this patent is extended or adjusted under 35 U.S.C. 154(b) by 378 days.

(21) Appl. No.: 10/976,453

(22) Filed: Oct. 29, 2004

(65) Prior Publication Data
US 2005/0095496 A1 May 5, 2005

(30) Foreign Application Priority Data
Oct. 31, 2003 (JP) ............................ 2003-408171
Jan. 30, 2004 (JP) ............................. 2004-24239

(51) Int. Cl.
H01M 4/86 (2006.01)
H01M 8/12 (2006.01)

(52) U.S. Cl. ............................ 429/41; 429/45; 429/30; 429/44; 429/32

(58) Field of Classification Search .................. 429/41, 429/45, 30, 44, 32
See application file for complete search history.

(56) References Cited
FOREIGN PATENT DOCUMENTS

JP 08-130018 * 5/1996
JP 2002-015754 * 1/2002
JP 2002-289248 * 10/2002

* cited by examiner

Primary Examiner—Patrick Joseph Ryan
Assistant Examiner—Angela J. Martin
(74) Attorney, Agent, or Firm—Hogan & Hartson LLP

(57) ABSTRACT

A solid electrolytic fuel cell having an oxygen electrode layer on one surface of a solid electrolytic layer, having a fuel electrode layer on the other surface thereof, and having a reaction-preventing layer comprising a sintered body of an oxide between the upper surface of the solid electrolytic layer and the oxygen electrode layer for preventing elements from diffusing from the oxygen electrode layer into the solid electrolytic layer, wherein the oxygen electrode layer has a two-layer structure including an inner layer on the side of the reaction-preventing layer and a surface layer on the inner layer; the surface layer of the oxygen electrode layer comprises a sintered body of a perovskite composite oxide; and the inner layer of the oxygen electrode layer comprises a sintered body of a mixture of particles of an oxide for preventing the diffusion of elements and particles of the peroviskite composite oxide, and is formed more densely than said surface layer. The fuel cell has a decreased interfacial resistance between the oxygen electrode layer and the reaction-preventing layer, an increased junction strength between the oxygen electrode layer and the reaction-preventing layer, and generates electricity of a large output.

8 Claims, 3 Drawing Sheets

Fig. 4

(a) 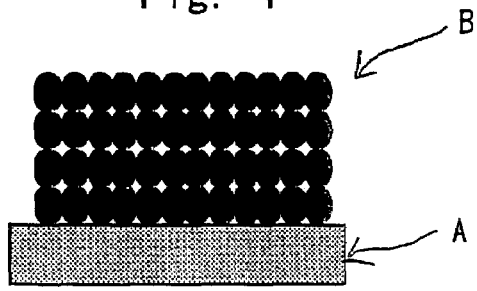

Number of contacts: large
thickness: large
· Chiefly volume diffusion
· Air gose down little (b) 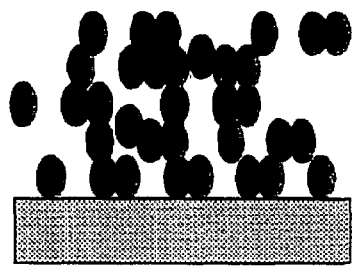

Number of contacts: small
thickness: large
· Chiefly surface diffusion
· Reaction field is narrow (c) 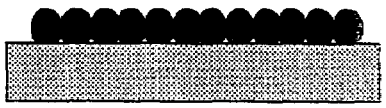

Number of contacts: large
thickness: small
· Reaction field is wide
· Small number of particles are volumetrically diffused (d) 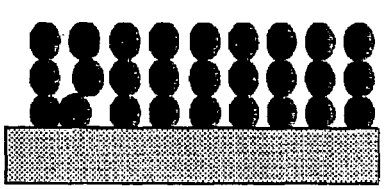

Number of contacts: proper
thickness: proper
· volume diffusion and surface diffusion
· High air utilization efficiency

FUEL CELL

BACKGROUND OF THE INVENTION

1. Field of the Invention

The present invention relates to a solid electrolytic fuel cell. More particularly, the invention relates to a solid electrolytic fuel cells having an oxygen electrode layer that is provided on a solid electrolytic layer via a reaction-preventing layer and to a fuel cell assembly.

2. Description of the Related Art

In recent years, a variety of fuel cell assemblies have been proposed as the energy of the next generation accommodating stacks of fuel cells in a container. As the fuel cells of these kinds, there have been known those of the solid high molecular type, phosphoric acid type, molten carbonate type and solid electrolytic type. Among them, despite of its operation temperature of as high as 800 to 1000° C., the fuel cell of the solid electrolytic type features a high generation efficiency offering such an advantage as utilizing waste heat, and its study and development have been forwarded.

The solid electrolytic fuel cell has a basic structure in which a fuel electrode is provided on one surface of the solid electrolytic layer and an oxygen electrode (air electrode) is provided on the other surface thereof. In this solid electrolytic fuel cell, in general, the oxygen ion conductivity of the solid electrolyte starts increasing at about 600° C., and a gas containing oxygen is supplied to the oxygen electrode side and a gas containing hydrogen is supplied to the fuel electrode side at the temperature of not lower than 600° C., so that a potential difference generates across the oxygen electrode and the fuel electrode based upon a difference in the oxygen concentration between the two electrodes.

Oxygen ions that migrate from the oxygen electrode to the fuel electrode through the solid electrolyte bond to hydrogen ions in the fuel electrode to form water. Here, electrons migrate simultaneously. In the fuel cell, therefore, the gas containing oxygen and the gas containing hydrogen are supplied to continuously trigger the above reaction to generate electricity. That is, electricity is generated by the electrode reactions on the oxygen electrode and on the fuel electrode as expressed by the following formulas:

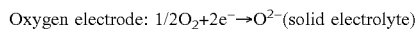

Oxygen electrode: $1/2 O_2 + 2e^- \rightarrow O^{2-}$ (solid electrolyte)

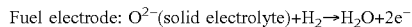

Fuel electrode: $O^{2-}$ (solid electrolyte) $+ H_2 \rightarrow H_2O + 2e^-$

In a solid electrolytic fuel cell that is usually used, the above cell structure is formed on a porous electrically conducting support member having gas passages therein, a fuel gas (hydrogen gas) is flown into the gas passages in the electrically conducting support member, hydrogen is supplied onto the surface of the fuel electrode via the electrically conducting support member and, at the same time, an oxygen-containing gas such as the air is flown onto the outer surface of the oxygen electrode thereby to supply oxygen onto the surface of the oxygen electrode, so that the above-mentioned electrode reactions take place on the electrodes, and an electric current that is generated is taken out through an interconnector provided on the electrically conducting support member. A plurality of fuel cells of this structure are connected in series by using collector members to form a cell stack. A plurality of these cell stacks are contained in a suitable container and are connected together by using conducting members so as to be used as a fuel cell assembly.

In the above solid electrolytic fuel cell, an La—Sr—Co perovskite composite oxide has been widely used as a material for forming the oxygen electrode owing to its surface diffusing function and volume diffusing function for oxygen ions and excellent operation at low temperatures (see Japanese Unexamined Patent Publication (Kokai) No. 08-130018).

In the conventional known solid electrolytic fuel cell, however, elements are diffused from the oxygen electrode to the solid electrolytic layer due to the heating at the time of generating electricity or at the time of production, arousing a problem in that an insulating layer is formed on the interface between the oxygen electrode and the solid electrolytic layer due to the diffusion of elements. To prevent the diffusion of elements, there has been proposed to provide a reaction-preventing layer comprising an oxide (e.g., Ce oxide) having ion conductivity and electron conductivity between the solid electrolytic layer and the oxygen electrode (see Japanese Unexamined Patent Publication (Kokai) No. 2002-15754).

Even when the above reaction-preventing layer is provided, however, performance of the fuel cell drops after the electricity is generated for extended periods of time due to a high interfacial resistance between the oxygen electrode and the reaction-preventing layer. As means for solving the above problem, Japanese Unexamined Patent Publication (Kokai) No. 2002-289248 proposes a technology in which the oxygen electrode is formed in a two-layer structure including a lower layer and an upper layer, the lower layer (i.e., layer on the side of the reaction-preventing layer) being a dense layer of particles of small sizes to decrease the interfacial resistance to the reaction-preventing layer, and the upper layer being a porous layer of particles of large sizes to increase the three-phase interfaces. However, this means still involves a problem of a weak mechanical junction strength between the lower layer of the oxygen electrode and the reaction-preventing layer, permitting the oxygen electrode layer to be peeled off the reaction-preventing layer after the electric generation of extended periods of time. Further, the solid electrolytic fuel cell provided with the reaction-preventing layer is still accompanied by a common problem in that the function of the oxygen electrode layer is not exhibited to a sufficient degree, and that the output is lower than that of the solid electrolytic fuel cell without the reaction-preventing layer.

SUMMARY OF THE INVENTION

It is therefore an object of the present invention to provide a solid electrolytic fuel cell having a structure of forming a reaction-preventing layer between the oxygen electrode and the solid electrolytic layer, having a decreased interfacial resistance between the oxygen electrode and the reaction-preventing layer, and featuring an increased junction strength between the oxygen electrode and the reaction-preventing layer.

Another object of the present invention is to provide a solid electrolytic fuel cell capable of maintaining a sufficiently large output without spoiling the properties of the oxygen electrode despite of the formation of the reaction-preventing layer.

According to the present invention, there is provided a solid electrolytic fuel cell having an oxygen electrode layer on one surface of a solid electrolytic layer, having a fuel electrode layer on the other surface of the solid electrolytic layer, and having a reaction-preventing layer comprising a sintered body of an oxide between the solid electrolytic layer and the oxygen electrode layer for preventing elements from diffusing from the oxygen electrode layer into the solid electrolytic layer, wherein:

the oxygen electrode layer has a two-layer structure including an inner layer on the side of the reaction-preventing layer and a surface layer on the inner layer;

the surface layer of the oxygen electrode layer comprises a sintered body of a perovskite composite oxide; and the inner layer of the oxygen electrode layer comprises a sintered body of a mixture of particles of an oxide for preventing the diffusion of elements and particles of the peroviskite composite oxide, and is formed more densely than said surface layer.

According to the present invention, further, there is provided a fuel cell assembly fabricated by containing, in a container, cell stacks obtained by electrically connecting in series a plurality of the above solid electrolytic fuel cells.

According to the present invention, it is desired that:
(a) The oxide for preventing the diffusion of elements is an oxide containing Ce as a constituent element;
(b) The oxide for preventing the diffusion of elements is a Ce composite oxide in which $SmO_3$ is solidly dissolved in $CeO_2$;
(c) The Ce composite oxide has a molar composition represented by the following general formula:

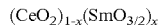

$(CeO_2)_{1-x}(SmO_{3/2})_x$ wherein x is a number of $0 < x \leq 0.3$;
(d) The inner layer of the oxygen electrode layer contains 10 to 30 mass % of the oxide for preventing the diffusion of elements and contains 70 to 90 mass % of the perovskite composite oxide;
(e) The perovskite composite oxide is an $(La, Sr)(Co, Fe)O_3$ oxide;
(f) The inner layer of the oxygen electrode layer is formed having a thickness smaller than that of the surface layer; and
(g) When the thickness of the inner layer is denoted by $L_1$ and the thickness of the surface layer by $L_2$, the inner layer and the surface layer of the oxygen electrode layer are so formed that an electrode function index W defined by the following formula (1):

$$W = W_1 + W_2 \qquad (1)$$

wherein $W_1$ is an index expressed by $n_1 \cdot L_1$, $W_2$ is an index expressed by $n_2 \cdot L_2$, $n_1$ is a number of contacts per a unit length (10 μm) on the interface between the inner layer and the reaction-preventing layer, and $n_2$ is a number of contacts per a unit length (10 μm) on the interface between the inner layer and the surface layer, is 300 to 500.

In the oxygen electrode layer of the two-layer structure of the present invention, the inner layer located on the reaction-preventing layer contains both particles of the oxide for preventing the diffusion of elements, forming the reaction-preventing layer, and particles of the perovskite composite oxide forming the surface layer of the oxygen electrode layer. Besides, the inner layer is densely formed as compared to the surface layer. Therefore, the interfacial resistance can be decreased between the oxygen electrode layer (inner layer) and the reaction-preventing layer, the junction strength can be increased between the oxygen electrode layer and the reaction-preventing layer, and the oxygen electrode layer is effectively prevented from being peeled off the reaction-preventing layer.

In the present invention, further, the inner layer of the oxygen electrode layer is formed for decreasing the interfacial resistance to the reaction-preventing layer and for increasing the junction strength. It is therefore desired that the inner layer of the oxygen electrode layer is formed having a thickness smaller than that of the surface layer so will not to lower the properties of the oxygen electrode layer. Further, the oxygen electrode layer of the double-layer structure is so formed that the electrode function index W defined by the above formula (1) is 300 to 500 and, particularly, 350 to 450, to effectively suppress a drop in the function of the oxygen electrode layer caused by the reaction-preventing layer and, hence, to increase the output of the fuel cell. When a material having a surface diffusion function and a volume diffusion for the oxygen ions, such as an La—Sr—Co perovskite oxide, is used as an oxygen electrode material, therefore, the surface diffusion function and the volume diffusion function are exhibited to a sufficient degree to obtain a high output.

Namely, the function of the oxygen electrode layer for oxygen ions includes the surface diffusion function and the volume diffusion function. As for the surface diffusion function, oxygen in vapor phase forms active atomic oxygen on the surfaces of particles (hereinafter called oxygen electrode particles) forming the oxygen electrode layer establishing a reaction field which migrates to the interface relative to the reaction-preventing layer (or to the solid electrolytic layer) passing through the surfaces of oxygen electrode particles, whereby electrons are received from the interface to form oxygen ions. As for the volume diffusion function, on the other hand, oxygen in vapor phase receives electrons from the oxygen electrode particles, and the formed oxygen ions migrate to the interface relative to the reaction-preventing layer (or to the solid electrolytic layer). In the present invention, the oxygen electrode layer is so formed that the function index W lies in a predetermined range, enabling both the surface diffusion function and the volume diffusion function to be exhibited maintaining a good balance.

Reference should be made, for example, to FIG. 4 illustrating the function of the oxygen electrode layer. In FIG. 4, symbol A denotes a reaction-preventing layer and symbol B denotes an oxygen electrode layer. In this example, the oxygen electrode layer is a single layer.

In FIG. 4(a), there are a large number of contacts n between the reaction-preventing layer A and the oxygen electrode layer B, and the thickness L of the oxygen electrode layer B is large. Accordingly, the volume diffusion becomes dominant, and the air (oxygen) reaches little the interface to the reaction-preventing layer B without almost exhibiting the surface diffusion function.

When the number of contacts n is small and the thickness L of the oxygen electrode layer B is large (see FIG. 4(b)), the volume diffusion takes place little and the surface diffusion becomes dominant. In this case, the reaction field is narrow and the surface diffusion function is low.

When the number of contacts n is large and the thickness L of the oxygen electrode layer B is small (see FIG. 4(c)), the reaction field becomes wide and the surface diffusion function is exhibited to a sufficient degree. However, a decreased number of particles undergo the volume diffusion, and the volume diffusion function is not satisfactory.

As will be understood from the above, upon setting the index to lie in a suitable range (see FIG. 4(d)), the index being represented by a product of the thickness L of the oxygen electrode layer B and the number of contacts n between the reaction-preventing layer A and the oxygen electrode layer B, both the volume diffusion and the surface diffusion work to a sufficient degree enhancing the air (oxygen) utilization efficiency to maintain a high output. According to the present invention, the oxygen electrode layer has a two-layer structure including the inner layer and the surface layer. Therefore, the electrode function index W of the oxygen electrode layer is represented by the sum $(W_1+W_2)$ of the electrode function index $W_1$ $(=n_1 \cdot L_1)$ of the inner layer and the electrode function index $W_2$ $(=n_2 \cdot L_2)$ of the surface layer. By setting the index W to lie in the above-mentioned range, both the volume diffusion function and the surface diffusion function are exhibited maintaining a good balance to maintain a high output.

In the present invention, the inner layer is formed more densely than the surface layer and, hence, the number of contacts $n_1$ is greater than the number of contacts $n_2$ ($n_1>n_2$). Besides, the inner layer is thinner than the surface layer and, hence, $L_1<L_2$.

BRIEF DESCRIPTION OF THE DRAWINGS

FIG. 4 is a view illustrating the functions of the oxygen electrode layer.

DETAILED DESCRIPTION OF THE INVENTION

Figure 1:
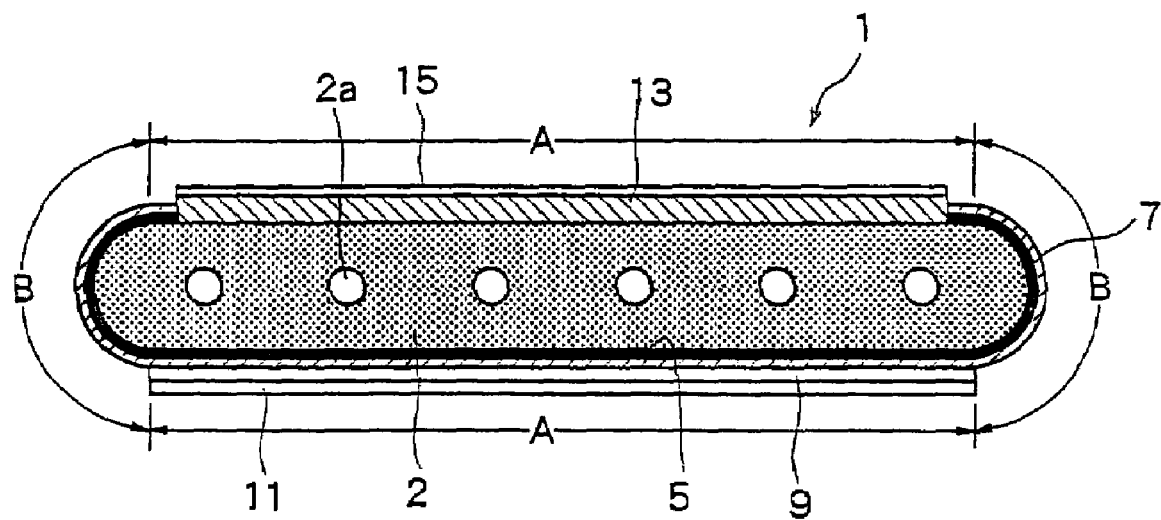
FIG. 1 is a transverse sectional view of a fuel cell of the present invention.
Figure 3:
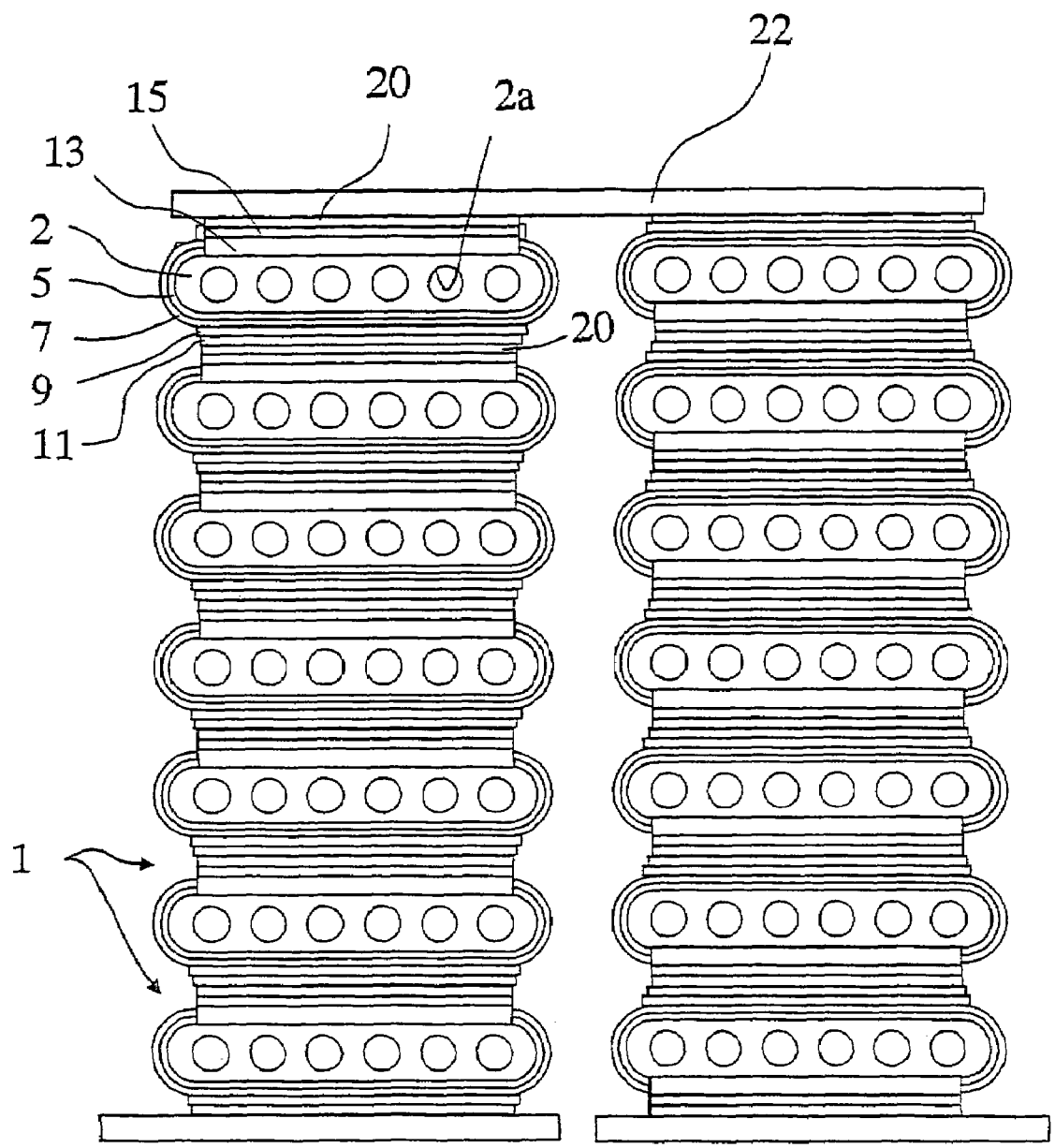
FIG. 3 is a sectional view schematically illustrating a cell stack formed by using the fuel cells of the present invention.

In FIG. 1, a fuel cell of the invention generally designated at 1 is in the form of a slender rod having a flat shape in transverse cross section thereof, and is provided with a support substrate 2 of a generally elliptic shape (flat rod) in transverse cross section. Namely, the support substrate 2 has a pole-like shape extending from the front to the back on the surface of the paper in FIG. 1. A plurality of fuel gas passages 2a are formed in the support substrate 2 penetrating through in the axial direction maintaining a suitable gap. A cell structure that will be described below is formed on the support substrate 2. A plurality of the fuel cells 1 are connected in series by using collector members 20 as shown in FIG. 3 to form a cell stack which constitutes a fuel cell assembly.

Referring to FIG. 1, the support substrate 2 has a transverse sectional shape including a flat portion A and curved portions B formed at both ends of the flat portion A. Both surfaces of the flat portion A are formed nearly in parallel, a fuel electrode layer 5 is provided on one surface of the flat portion A, and a dense solid electrolytic layer 7 is laminated so as to cover the fuel electrode layer 5. On the solid electrolytic layer 7, there are further laminated a reaction-preventing layer 9 and an oxygen electrode layer 11 in this order from one surface of the flat portion A on both sides so as to be faced to the fuel electrode layer 5. Further, an interconnector 13 is formed on the other surface of the flat portion A of the support substrate 2. As will be obvious from FIG. 1, the solid electrolytic layer 7 is extending up to both sides of the interconnector 13, so that the surfaces of the support substrate 2 are not exposed to the outer side.

In the fuel cell 1 of the above structure, a portion where the fuel electrode layer 5 and the oxygen electrode layer 11 are facing each other holding the solid electrolytic layer 7 therebetween works as a generating portion. That is, an oxygen-containing gas such as the air is flown to the outer side of the oxygen electrode layer 11, a fuel gas (hydrogen) is flown into the gas passages 2a in the support substrate 2, which are, then, heated to a predetermined operation temperature, so that the above-mentioned electrode reactions take place on the oxygen electrode layer 11 and on the fuel electrode layer 5 to generate electricity.

The electric current produced by the above electric generation is collected through the interconnector 13 mounted on the support substrate 2.

(Support Substrate 2)

In the fuel cell 1 of the present invention, it is required that the support substrate 2 is gas-permeable enabling the fuel gas to permeate to the fuel electrode layer 5, and is electrically conductive to collect electricity through the interconnector 13. To avoid inconvenience caused by the simultaneous firing while satisfying the above requirements, it is desired that the support substrate 2 is constituted by using a metal component of the iron group and a particular rare earth oxide.

The metal component of the iron group is for imparting electric conduction to the support substrate 2, and may be a simple metal of the iron group, or may be an oxide of a metal of the iron group, an alloy of a metal of the iron group or an alloy oxide thereof. Examples of the metal of the iron group include iron, nickel and cobalt, and any one of them can be used in the present invention. From the low cost and stability in the fuel gas, however, it is desired that Ni and/or NiO are contained as the components of the iron group.

The rare earth oxide component is used for bringing the coefficient of thermal expansion of the support substrate 2 close to the coefficient of thermal expansion of the solid electrolytic layer 7. In order to maintain a high electric conduction and to prevent elements from diffusing into the solid electrolytic layer 7, it is desired that the rare earth oxide containing at least one kind of rare earth element selected from the group consisting of Y, Lu, Yb, Tm, Er, Ho, Dy, Gd, Sm and Pr is used in combination with the above component of the iron group. As the rare earth oxide, there can be exemplified $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. Among them, $Y_2O_3$ and $Yb_2O_3$ are particularly preferred from the standpoint of low cost.

During the firing or while generating electricity, these rare earth oxides are not almost solidly dissolved in, or do not almost react with, the metal of the iron group or oxides thereof. Besides, the metal of the iron group or oxides thereof in the support substrate 2, and the rare earth oxides, are not diffused. Therefore, even when the support substrate 2 and the solid electrolytic layer 7 are simultaneously fired, rare earth elements are effectively suppressed from being diffused into the solid electrolytic layer 7, avoiding adverse effect on the ionic conductivity of the solid electrolytic layer 7.

In the present invention, it is desired that the component of the iron group is contained in the support substrate 2 in an amount of 65 to 35% by volume, and the rare earth oxide is contained in the support substrate 2 in an amount of 35 to 65% by volume from the standpoint of bringing the coefficient of thermal expansion of the support substrate 2 close to the coefficient of thermal expansion of the solid electrolytic layer 7. The support substrate 2 may contain other metal components and oxide components within a range in which they do not impair the required characteristics.

The support substrate 2 constituted by the above metal component of the iron group and the rare earth oxide must have a fuel gas permeability and, usually, has an open porosity of not smaller than 30% and, particularly, in a range of 35 to 50%. It is further desired that the support substrate 2 has an electric conductivity of not smaller than 300 S/cm and, particularly, not smaller than 440 S/cm.

It is further desired that the flat portion A of the support substrate 2 has a length of, usually, 15 to 35 mm, the curved portions B have a length (length of arc) of about 3 to about 8 mm, and the support substrate 2 has a thickness (gap between both surfaces of the flat portion A) of about 2.5 to about 5 mm.

(Fuel Electrode Layer 5)

In the present invention, the fuel electrode layer 5 is for producing the electrode reaction and is made of a known porous cermet. For example, the fuel electrode layer 5 is made of $ZrO_2$ or $CeO_2$ in which a rare earth element is solidly dissolved, and Ni and/or NiO.

It is desired that the content of $ZrO_2$ or $CeO_2$ in the fuel electrode layer 5 is in a range of 35 to 65% by volume, and the content of Ni or NiO is 65 to 35% by volume. It is further desired that the fuel electrode layer 5 has an open porosity of not smaller than 15% and, particularly, in a range of 20 to 40%, and has a thickness of 1 to 30 μm to prevent a drop of performance and to prevent the peeling caused by a difference in the thermal expansion.

As the rare earth elements solidly dissolved in $ZrO_2$ or $CeO_2$, further, there can be exemplified those which are the same as those exemplified concerning the rare earth oxides used for the support substrate 2. From the standpoint of lowering the polarizing value of the cell, however, it is desired that Y is solidly dissolved in an amount of about 3 to about 10 mol % in $ZrO_2$ and Sm is solidly dissolved in an amount of about 5 to 20 mol % in $CeO_2$.

Further, the fuel electrode layer 5 may be located at a position facing at least the oxygen electrode layer 11. That is, in the example of FIG. 1, the fuel electrode layer 5 is extending from the flat portion A on one side of the support substrate 2 up to the flat portion A of the other side, i.e., extending up to both ends of the interconnector 13. The fuel electrode layer 5, however, may be formed on the flat portion A of the one side only, or may be formed over the whole circumference of the support substrate 2.

Though not illustrated, a diffusion-suppressing layer (which is different from the reaction-preventing layer 9) may, as required, be provided on the fuel electrode layer 5 so as to be interposed between the fuel electrode layer 5 and the solid electrolytic layer 7. The diffusion-suppressing layer is for suppressing the elements from diffusing into the solid electrolytic layer 7 from the fuel electrode layer 5 or from the support substrate 2, and for avoiding a drop of performance caused by the formation of the insulating layer, and is made of $CeO_2$ in which La is solidly dissolved, $La_2O_3$ in which Ce is solidly dissolved, or a mixture thereof. In order to enhance the effect for shielding or suppressing the diffusion of elements, further, oxides of other rare earth elements may be contained in the reaction-preventing layer. As the rare earth elements, there can be exemplified Sc, Y, Pr, Nd, Pm, Sm, Eu, Gd, Tb, Dy, Ho, Er, Tm, Yb and Lu.

It is desired that the diffusion-suppressing layer extends together with the solid electrolytic layer 7 up to both ends of the interconnector 13. This makes it possible to reliably prevent the diffusion of elements into the solid electrolytic layer 7 from the support substrate 2 or the fuel electrode layer 5.

(Solid Electrolytic Layer 7)

The solid electrolytic layer 7 must have a function of the electrolyte for carrying electrons between the electrodes while shielding the gas to prevent the leakage of the fuel gas and the oxygen-containing gas such as the air. As the solid electrolyte for forming the layer 7, therefore, it is desired to use dense ceramics having the above properties, such as stabilized $ZrO_2$ in which a rare earth element is solidly dissolved in an amount of, for example, 3 to 15 mol %. As the rare earth element in the stabilized $ZrO_2$, there can be used Sc, Y, La, Ce, Pr, Nd, Pm, Sm, Eu, Gd, Td, Dy, Ho, Er, Tm, Yb and Lu. Among them, however, it is desired to use Y or Yb from the standpoint of cost.

Further, a perovskite type lanthanum gallate composite oxide containing La and Ga can be used as a solid electrolyte. This composite oxide has a high oxygen ionic conductivity. By using this composite oxide as a solid electrolyte, therefore, a high generation efficiency is obtained. It is desired that the lanthanum gallate composite oxide contains La and Sr in the A-site, and Ga and Mg in the B-site, and has a composition represented, for example, by the following general formula (i),

$(La_{1-x}Sr_x)(Ga_{1-y}Mg_y)O_3$     (i)

wherein x is a number of 0<x<0.3, and y is a number of 0<y<0.3.

By using the composite oxide having the above composition as a solid electrolyte, too, a high generation performance can be obtained.

It is desired that the above solid electrolytic layer 7 has a thickness of 10 to 100 μm from the standpoint of preventing the permeation of gas, and has a relative density (according to Archimedes' method) of not lower than 93% and, particularly, not lower than 95%.

(Reaction-Preventing Layer 9)

The reaction-preventing layer 9 formed on the solid electrolytic layer 7 and is interposed between the oxygen electrode layer 11 and the solid electrolytic layer 7, is for shutting off the diffusion of elements from the oxygen electrode layer 11 into the solid electrolytic layer 7, and is made of a sintered body of an oxide having a function for preventing the diffusion of elements. As the above oxide for preventing the diffusion of elements, there can be exemplified the one containing Ce as a constituent element. In particular, the Ce composite oxide in which an oxide of a rare earth element is solidly dissolved in $CeO_2$, is preferably used owing to its high element diffusion shut-off property as well as an excellent oxygen ion conductivity and an electron conductivity. As the above oxide of the rare earth element, there can be used oxides of the above-mentioned various rare earth elements and, particularly, an oxide of Sm. In the present invention, the Ce composite oxide in which $Sm_2O_3$ is solidly dissolved in $CeO_2$ and which has a composition represented by the following general formula (ii),

$(CeO_2)_{1-x}(SmO_{3/2})_x$     (ii)

wherein x is a number of 0<x≦0.3 and, particularly, 0.1≦x≦0.2, has an excellent oxygen ion conductivity and an electron conductivity in addition to a high element diffusion shut-off property, and is best suited as a material for forming the reaction-preventing layer. Namely, by forming the reaction-preventing layer 9 by using the Ce composite oxide (hereinafter often called SDC composite oxide) having a molar composition represented by the above general formula (ii), it is made possible to effectively shut off the diffusion of elements from the oxygen electrode layer 11 to the solid electrolytic layer 7 without impairing the electrode reaction on the interface relative to the solid electrolytic layer 7 and without increasing the resistance across the electrode. As required, further, the reaction-preventing layer 9 can be formed by also using oxides of other rare earth elements in a range of not impairing the above excellent properties of the Ce composite oxide.

It is further desired that the reaction-preventing layer 9 is made of a relatively densely sintered body having a relative density of not lower than 80% and has a thickness of about 3 to about 10 μm so as to exhibit a desired element diffusion shut-off function without impairing the electrode reactions.

(Oxygen Electrode Layer 11)

The oxygen electrode layer 11 formed on the reaction-preventing layer 9 is for producing the electrode reactions described above, and is arranged so as to face the fuel electrode layer 5 with the solid electrolytic layer 7 held therebetween as shown in FIG. 1. That is, the oxygen electrode layer 11 is arranged on a portion located on at least one flat portion A of the support substrate 2.

Figure 2:
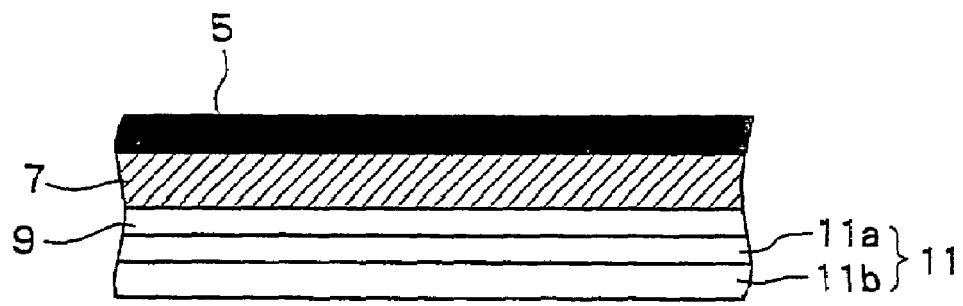
FIG. 2 is a sectional view illustrating, on an enlarged scale, an oxygen electrode layer which is a major portion of the fuel cell of the present invention together with other layers neighboring thereto.

In the present invention as shown in FIG. 2, the oxygen electrode layer 11 has a two-layer structure including an inner layer 11a (layer neighboring the reaction-preventing layer 9) and the surface layer 11b. The inner layer 11a is densely formed as compared to the surface layer 11b, and is made of a sintered body of a mixture of particles of the oxide (e.g., above-mentioned Ce composite oxide) for preventing the diffusion of elements used for forming the reaction-preventing layer 9 and particles of the so-called $ABO_3$ type perovskite composite oxide. The surface layer 11b formed on the inner layer 11a is porous as compared to the inner layer 11a, and is made of a sintered body of the perovskite composite oxide. Namely, between the surface layer 11b and the reaction-preventing layer 9, there is densely formed the inner layer 11a which contains the material (oxide for preventing the diffusion of elements) for forming the reaction-preventing layer and the material (perovskite composite oxide) for forming the surface layer. Therefore, the junction strength is high between the oxygen electrode layer 11 and the reaction-preventing layer 9, and the interfacial resistance is low between these two layers.

As the perovskite composite oxide used for forming the inner layer 11a and the surface layer 11b, there is desirably used a transition metal type perovskite composite oxide and, particularly, at least one of an $LaMnO_3$ composite oxide having La in the A-site, an $LaFeO_3$ composite oxide or an $LaCoO_3$ composite oxide. Particularly preferably, there is used an (La, Sr) (Co, Fe)$O_3$ composite oxide (hereinafter often called La—Sr—Co composite oxide) such as a composite oxide having a composition represented by, for example, the following general formula (iii), $$La_ySr_{1-y}Co_zFe_{1-z}O_3 \quad (iii)$$

wherein y is a number of $0.5 \leq y \leq 0.7$, and Z is a number of $0.2 \leq Z \leq 0.8$, owing to its high electric conductivity at temperatures of as relatively low as about 600 to about 1000° C. and excellent surface diffusion function and volume diffusion function for oxygen ions.

In the inner layer 11a, further, the oxide for preventing the diffusion of elements used in combination with the perovskite composite oxide, is also used for forming the reaction-preventing layer 9. The above-mentioned Ce composite oxide and, particularly, the SDC composite oxide having a composition expressed by the above general formula (ii) is best suited from the standpoint of exhibiting particularly high ion conductivity and electron conductivity. Namely, the Ce composite oxide is a mixed conductor having ion conductivity and electron conductivity and, upon the combination with the above perofskite composite oxide, forms a so-called three-phase interface, greatly lowering the interfacial resistance and exhibiting the function of the oxygen electrode to a sufficient degree. Usually, it is desired that the oxide for preventing the diffusion of elements is contained in the inner layer 11a in an amount of 10 to 30 mass %, and the perovskite composite oxide is contained in the inner layer 11a in an amount of 70 to 90 mass %, to most effectively enhance the junction strength to the reaction-preventing layer 9 without lowering the function of the oxygen electrode and to decrease the interfacial resistance.

The inner layer 11a of the oxygen electrode layer 11 is for enhancing the junction strength to the reaction-preventing layer 9, and is densely formed as compared to the surface layer 11b but must have gas permeability to some extent. Usually, therefore, the inner layer 11a has a porosity of not larger than 20% and, particularly, in a range of 5 to 20%. The inner layer 11a exhibits a decreased function of the oxygen electrode if it is formed too thickly. Usually, therefore, the inner layer 11a has a thickness $L_1$ smaller than that of the surface layer 11b and, particularly, in a range of 3 to 20 μm and, more particularly, 5 to 10 μm.

The surface layer 11b is made of particles of the sintered body of the perovskite composite oxide. This layer 11b exhibits its intrinsic function as the oxygen electrode and is more porous than the inner layer 11a, has a high gas permeability, and its porosity is higher than that of the inner layer 11a and is, usually, in a range of about 30 to about 50%. Further, the surface layer 11b is formed having a thickness larger than that of the inner layer 11a, i.e., having a thickness $L_2$ in a range of 35 to 85 μm and, particularly, 40 to 60 μm.

In the present invention, further, the inner layer 11a and the surface layer 11b are so formed that an electrode function index W defined by the following formula (1),

$$W = W_1 + W_2$$

wherein $W_1$ is an index expressed by $n_1 \cdot L_1$, $W_2$ is an index expressed by $n_2 \cdot L_2$, $n_1$ is a number of contacts per a unit length (10 μm) on the interface between the inner layer 11a and the reaction-preventing layer 9, $L_1$ is a thickness of the inner layer 11a, $n_2$ is a number of contacts per a unit length (10 μm) on the interface between the inner layer and the surface layer, and $L_2$ is a thickness of the surface layer 11b, is 300 to 500, so that the surface diffusion function and the volume diffusion function of the oxygen electrode layer 11 are exhibited to a sufficient degree. As described above, the inner layer 11a has a thickness smaller than that of the surface layer 11b and, hence, $L_1 < L_2$. Further, the inner layer 11a is formed more densely than the surface layer 11b and is, hence, $n_1 > n_2$.

That is, the number of contacts $n_1$ on the interface between the surface layer 11a and the reaction-preventing layer 9, and the number of contacts $n_2$ between the inner layer 11b and the surface layer 11a, are adjusted depending upon the thicknesses $L_1$ and $L_2$ such that the electrode function index W lies within the above-mentioned range. Therefore, the oxygen electrode layer 11 exhibits the surface diffusion function and the volume diffusion function in a well balanced manner to a sufficient degree to enhance the efficiency for utilizing the oxygen-containing gas (air) and to maintain a high output. In particular, when the (La, Sr)(Co, Fe)$O_3$ oxide is used as the perovskite composite oxide for forming the oxygen electrode layer, the excellent surface diffusion function and the volume diffusion function of the oxide are exhibited to a sufficient degree, which is most advantageous in the present invention.

The numbers of contacts $n_1$, $n_2$ in the above formula can be measured by cutting the fuel cell and by observing the interfaces of the layers on the cut surfaces by using an electron microscope. As will be described in Examples appearing later, for example, the fuel cell is cut at any three positions, and the numbers of contacts are measured per a unit length (10 μm) on the interface of the cut surfaces to find average values thereof. Usually, the numbers of contacts n1, n2 are adjusted by adjusting the firing conditions or by adjusting the coating conditions in forming the oxygen electrode layer 11 (inner layer 11a and surface layer 11b) as will be described later.

(Interconnector 13)

At a position facing the oxygen electrode layer 11, the interconnector 13 provided on the support substrate 2 is made of electrically conducting ceramics which must have resistance against the reduction and oxidation since it comes in contact with the fuel gas (hydrogen) and oxygen-containing gas. As the electrically conducting ceramics, therefore, a lanthanum chromite type perovskite oxide ($LaCrO_3$ oxide) is, usually, used. To prevent the leakage of fuel gas passing through the inside of the support substrate 2 and the leakage of oxygen-containing gas passing through the outside of the support substrate 2, further, the electrically conducting ceramics must be dense, and must have a relative density of, for example, not lower than 93% and, particularly, not lower than 95%.

From the standpoint of preventing the leakage of gas and electric resistance, it is desired that the interconnector 13 has a thickness of 10 to 200 μm. When the thickness is smaller than the above range, gases tend to leak. When the thickness is greater than the above range, on the other hand, the electric resistance increases, and the collection function decreases due to a potential drop.

Further, the interconnector 13 can be directly provided on the other flat portion A of the support substrate 2, or can be formed on the support substrate 2 via, for example, a junction layer made of $Y_2O_3$ or the like. As described earlier, further, when the fuel electrode layer 5 is provided over the whole circumference of the support substrate 2, the interconnector 13 is formed on the support substrate 2 holding the fuel electrode layer 5 therebetween.

It is further desired to provide a P-type semiconductor layer 15 on the outer surface (upper surface) of the interconnector 13. That is, in a cell stack (see FIG. 3) assembled by using the fuel cells, an electrically conducting collector member 20 is connected to the interconnector 13. Here, if the collector member 20 is directly connected to the interconnector 13, the potential drop increases due to non-ohmic contact, and the collection performance decreases. By connecting the collector member 20 to the interconnector 13 via the P-type semiconductor layer 15, however, the contact between the two becomes ohmic contact, whereby the potential drop decreases effectively avoiding a drop in the collection performance permitting, for example, an electric current from the oxygen electrode layer 11 of one fuel cell 1 to be effectively conducted to the support substrate 2 of another fuel cell 1.

As the above P-type semiconductor, there can be exemplified a transition metal perovskite oxide.

Concretely speaking, there can be used P-type semiconductor ceramics of at least one kind, such as an $LaMnO_3$ oxide, an $LaFeO_3$ oxide or an $LaCoO_3$ oxide containing Mn, Fe or Co in the B-site and having an electron conductivity larger than that of the $LaCrO_3$ oxide with which the interconnector 13 is constituted. The P-type semiconductor layer 15 has a thickness, usually, in a range of 30 to 100 im.

(Production of the Fuel Cell)

The fuel cell having the above structure can be produced by a known method except that the oxygen electrode layer is formed in a two-layer structure.

To adjust the electrode function index W to lie within a predetermined range by adjusting the numbers of contacts $n_1$, $n_2$ and the thicknesses $L_1$, $L_2$, it is desired that the oxygen electrode layer 11 (inner layer 11a and surface layer 11b) is formed by applying, onto the reaction-preventing layer 9 formed on the solid electrolytic layer 7, a coating solution containing a predetermined material for forming a layer, followed by firing.

The above coating solution is prepared by dispersing particles of a predetermined perovskite composite oxide and particles of an oxide for preventing the diffusion of elements, in an organic solvent such as isopropyl alcohol or toluene. In the coating solution, it is desired that the particles of the perovskite composite oxide and of the oxide for preventing the diffusion of elements have a cumulative average particle size ($D_{50}$) in a range of 0.4 to 1 μm and, particularly, 0.6 to 0.8 μm from the standpoint of adjusting the numbers of contacts $n_1$, $n_2$. When the particles have a cumulative average particle size that lies outside the above range, the number of contacts $n_1$, $n_2$ become unnecessarily great or small due to the firing described below. In order to bring the electrode function index W to lie in the desired range, therefore, the thickness must be very decreased or increased. It is further desired that the particles have a particle size distribution which is as sharp as possible. For example, it is desired that large particles having sizes of not smaller than 1.2 μm are contained in an amount of not larger than 5 mass % and fine particles of not larger than 0.3 μm are contained in an amount of not larger than 3 mass %. That is, even when the cumulative average particle size ($D_{50}$) lies in the above range, the numbers of contacts $n_1$, $n_2$ are likely to be greatly dispersed if the particle size distribution is too broad.

The above coating solution can be applied by any method. From the standpoint of adjusting the numbers of contacts $n_1$, $n_2$, however, it is desired that the coating solution is applied by spraying. Namely, the coating solution is prepared by using a solvent in an amount which can be sprayed, and the spraying distance and the spraying pressure are adjusted depending upon the amount of the solvent to control the numbers of contacts $n_1$, $n_2$. For example, if the spraying distance or the spraying pressure is increased, the solvent dries in an increased amount while being sprayed, whereby the content of the solvent in the coated layer decreases and the numbers of contacts $n_1$, $n_2$ increase. Conversely, if the spraying distance or the spraying pressure is decreased, the solvent dries in a decreased amount while being sprayed, whereby the content of the solvent in the coated layer increases and the numbers of contacts $n_1$, $n_2$ decrease. Thus, the coating solution is applied by spraying to successively form the inner layer 11a and the surface layer 11b maintaining the thicknesses $L_1$, $L_2$ to adjust the numbers of contacts $n_1$, $n_2$ and to obtain a desired electrode function index W.

It is desired that the coating solution after applied is baked at a temperature as relatively low as about 1000 to 1200° C. If the baking is conducted at a too low temperature, the particles are not sintered making it difficult to form the layers. If the baking is conducted at a too high temperature, on the other hand, the particles are integrated together causing a great decrease in the numbers of contacts $n_1$, $n_2$ and causing the oxygen electrode layer 11 (inner layer 11$a$ or the surface layer 11$b$) that is formed to lose the gas permeability and deteriorating the electrode properties.

In the present invention, the structure for supporting the oxygen electrode layer 11 of the two-layer structure formed as described above, is produced through the co-firing as described below.

First, a powder of the material for forming the support substrate is mixed with an organic binder and a solvent to prepare a slurry thereof. The slurry is extrusion-molded into a sheet for forming the support substrate (support substrate-forming article) and is dried. The support substrate-forming article is calcined at 900 to 1000° C. to prepare a calcined support substrate. The support substrate-forming article may not be calcined if it has a predetermined strength.

Further, a powder of the material for forming the fuel electrode layer is mixed with an organic binder and a solvent to prepare a slurry thereof. The slurry is formed into a sheet for forming the fuel electrode (fuel electrode-forming article) by a doctor blade method or the like method, and is laminated on the above calcined support substrate. Instead of forming the fuel electrode-forming article, a paste obtained by dispersing the starting fuel electrode material in a solvent may be applied onto a predetermined position of the calcined support substrate formed as described above thereby to form a coated layer for forming the fuel electrode layer.

Further, a powder (usually, the particle size is in a range of 0.5 to 3 µm) of the material for forming the solid electrolyte is added with toluene, a binder and a commercially available dispersing agent to prepare a slurry thereof which is, then, formed into a sheet-like solid electrolyte-forming article having a thickness of 10 to 50 µm by the doctor blade method or the like method. The solid electrolyte-forming article is laminated on the fuel electrode-forming material on the calcined support substrate and is dried to obtained a laminated article. Here, a diffusion suppressing layer-forming article may be formed on the above fuel electrode layer-forming article by using a slurry containing the material for forming the diffusion suppressing layer, and the solid electrolyte-forming article may be arranged on the diffusion suppressing layer.

After the fuel electrode layer-forming article and the solid electrolyte-forming article are formed on the support substrate-forming article as described above, the calcining may be effected.

Next, a reaction preventing layer-forming article is provided on the above laminated article. The reaction preventing layer-forming article is formed by mixing a ceramic power of the reaction preventing layer-forming material, a binder such as an acrylic resin and a solvent such as toluene together to prepare a slurry thereof, and applying the slurry onto the above solid electrolyte-forming article.

It is desired that the ceramic powder (oxide powder for preventing the diffusion of elements) is so adjusted as to possess a degree of aggregation of 5 to 35, thereby to control the firing shrinkage and to prevent the peeling of the solid electrolyte and the occurrence of cracks. It is particularly desired that the degree of aggregation is adjusted to be 5 to 15 from the standpoint of preventing a drop in the generation performance. The degree of aggregation is found from the following formula, Degree of aggregation=(Diameter of particles found by a laser beam scattering method)/(Diameter of a pseudosphere found from the BET specific surface area)

When the degree of aggregation is large, the primary particles in the aggregated particles are very small and the sintering activity is high. Therefore, the sintering among the primary particles proceed faster than the sintering among the aggregated particles. Therefore, shrinkage of the aggregated particles proceeds while the entire shrinkage is delayed, and the gaps among the aggregated particles like those of a stone wall are cracked. The starting solid electrolyte, on the other hand, has a particle size of 0.5 to 3 µm from the standpoint of being co-fired with the support member. Therefore, the solid electrolytic layer 7 in contact with the reaction-preventing layer 9 is cracked and is peeled like a wall stone being pulled by the firing shrinkage of the reaction-preventing layer 9. When the degree of aggregation is small, sintering of the primary particles, sintering among the aggregated particles and sintering of the solid electrolyte start almost simultaneously, and a homogeneously sintered body is obtained. The degree of aggregation can be adjusted by, for example, pulverizing the starting powder by using a vibration mill or the like to adjust the grain size, calcining the starting powder at a temperature of about 800 to about 1000° C. for several hours, and pulverizing the powder again by using a ball mill or the like.

In the present invention, further, the reaction-preventing layer 9 is formed by using the ceramic powder (oxide powder for preventing the diffusion of elements) having a degree of aggregation in the above-mentioned range, whereby the surface of the reaction-preventing layer 9 (interface relative to the inner layer 11$a$ of the oxygen electrode layer 11) becomes relatively porous, and fine pores of diameters of about 1 to 2 µm and depths of several µm are distributed in the surface portion thereof. As a result, the number of contacts $n_1$ increases (particle of the inner layer enter into the pores), and the junction strength increases between the reaction-preventing layer 9 and the inner layer 11$a$ of the oxygen electrode layer owing to the anchoring effect.

After the reaction preventing layer-forming article is provided as described above, the material for forming the interconnector is mixed with an organic binder and a solvent to prepare a slurry thereof to form a sheet for forming the interconnector. The interconnector-forming sheet is laminated on a predetermined position of the laminated article obtained above to prepare a firing-laminate.

Next, the firing-laminate is subjected to a treatment for removing the binder, fired in the open air at 1350 to 1600° C., and the oxygen electrode layer 11 is formed on a predetermined position of the obtained sintered body by the method described above to prepare a desired fuel cell. As required, further, a paste containing a P-type semiconductor layer material (e.g., LaFeO₃ oxide powder) and a solvent is applied by dipping simultaneously with the formation of the oxide electrode layer 11, and is fired at 1000 to 1300° C. to form the P-type semiconductor layer 15 on the interconnector 13.

(Cell Stack)

A cell stack is constituted by a set of a plurality of the above-mentioned fuel cells 1 as shown in FIG. 3 while interposing a collector member 20 made of a metal felt and/or a metal plate between one fuel cell 1a and another fuel cell 1b that are neighboring up and down to connect them in series. Namely, the support substrate 2 of one fuel cell 1a is electrically connected to the oxygen electrode layer 11 of the other fuel cell 1b via the interconnector 13, P-type semiconductor substrate 15 and collector member 20. Further, the above cell stacks are arranged neighboring each other as shown in FIG. 3. The neighboring cell stacks are connected in series through a conductor member 22.

The fuel cell structure of the invention is constituted by containing the cell stack of FIG. 3 in a container. The container is provided with introduction pipes for introducing the fuel gas such as hydrogen into the fuel cells 1 from an external unit and introduction pipes for introducing the oxygen-containing gas such as the air into space on the outer side of the fuel cells 1. Electricity is generated when the fuel cells are heated at a predetermined temperature (e.g., 600 to 900° C.), and excess of fuel gas and oxygen-containing gas are burned and discharged out of the container.

The present invention is not limited to the above embodiment only but can be modified in a variety of ways so far as the oxygen electrode layer 11 is satisfying predetermined conditions. For example, the support substrate 2 may be formed in a cylindrical shape.

(Experiments)

The invention will now be described by way of the following experiments.

In the following Experiment 1, there were used three kinds of (La, Sr) (Co, Fe)$O_3$ perovskite composite oxides (called LSCFs) having the following molar compositions as the perovskite composite oxides for forming the oxygen electrode layer. Further, the following oxides were used for forming the reaction-preventing layer or as an element diffusion-preventing oxide for forming the inner layer of the oxygen electrode layer.

Perovskite composite oxides (LSCFS) for forming the oxygen electrode layer:
(A) $La_{0.6}SR_{0.4}Co_{0.2}Fe_{0.8}O_3$ (abbreviated as 6428)
(B) $La_{0.6}SR_{0.4}Co_{0.4}Fe_{0.6}O_3$ (abbreviated as 6426)
(C) $La_{0.6}SR_{0.4}Co_{0.6}Fe_{0.4}O_3$ (abbreviated as 6464)

Oxide for preventing the diffusion of elements:
Ce composite oxide having a mole composition $(CeO_2)_{85}(SmO_{3/2})_{15}$ (hereinafter called SDC15).

EXAMPLE 1

First, an NiO powder having an average particle size of 0.5 μm and a $Y_2O_3$ powder having an average particle size of 0.9 μm were so mixed together that the volume ratio (NiO/$Y_2O_3$) after firing and reduction was 48/52, and to which were further added an organic binder and a solvent to prepare a slurry thereof. The slurry was molded by the extrusion-molding method, and was dried and dewaxed to prepare an electrode support substrate-forming article.

Next, an Ni powder having an average particle size of 0.5 μm, a $ZrO_2$ powder in which a rare earth element (Y) has been solidly dissolved, an organic binder and a solvent were mixed together to prepare a slurry. The slurry was applied onto the electrode support substrate-forming article prepared above by a screen-printing method and was dried to form a coated layer for forming the fuel electrode layer.

Further, the $ZrO_2$ powder in which scandium has been solidly dissolved in an amount of 8 mol %, an organic binder and a solvent were mixed together to prepare a slurry thereof. The slurry was formed into a sheet for forming the solid electrolytic layer by a doctor blade method. The sheet was stuck onto the coated layer for forming the fuel electrode layer on the electrode support substrate-forming article, and was dried to prepare a laminated article. The laminated article was calcined at 1000° C.

Next, the element diffusion-preventing oxide (SDC 15) was pulverized by using a vibration mill for 24 hours, calcined at 900° C. for 4 hours, and was pulverized again by using a ball mill, so that the degree of aggregation of the powder was 13 to 16. To the SDC 15 powder were added an acrylic binder and a toluene to prepare a slurry. The slurry was applied onto the solid electrolyte-forming sheet of the laminated article calcined above by the screen-printing method to form a coated layer for forming the reaction-preventing layer.

Further, an $LaCrO_3$ composite oxide (material for forming the interconnector), an organic binder and a solvent were mixed together to prepare a slurry thereof. The slurry was laminated on the surface of the electrode support substrate-article exposed on the surface of the calcined laminated article. The calcined laminate-forming material was calcined in an oxygen-containing atmosphere at 1485° C. to prepare a sintered laminate.

Next, the LSCF powder (A), (B) or (C) having an average particle size adjusted to 0.8 μm and the SDC 15 powder having a degree of aggregation adjusted to 13 to 16 were mixed together at ratios shown in Table 1, and to which was further mixed an isopropyl alcohol to prepare a slurry. The slurry was applied by printing onto the surface of the reaction-preventing layer of the sintered laminate and was dried at 130° C. to form an inner coated layer of the oxygen electrode layer. Further, the LSCF powder used above and the isopropyl alcohol were mixed together to prepare a slurry which was, then, applied by spraying onto the inner coated layer to form a surface coated layer of the oxygen electrode layer, followed by firing at a temperature shown in Table 1 to form an oxygen electrode layer of the two-layer structure thereby to prepare a fuel cell (samples Nos. 1 to 18). In the sample No. 18, however, the surface layer of the oxygen electrode layer was formed by using a powder obtained by mixing the LSCF powder (C) and the SDC 15 powder at a weight ratio of 90/10.

The fuel cells that were prepared were as follows:
Fuel cell size: 25 mm×200 mm
Electrode support substrate:
  Thickness; 3 mm
  Open porosity; 35%
Fuel electrode layer:
  Thickness; 10 μm
Solid electrolytic layer:
  Thickness; 32 μm
  Relative density; 97%
Reaction-preventing layer:
  Thickness; 10 μm A hydrogen gas was flown into the fuel cell prepared as described above to reduce the electrode support substrate and the fuel electrode layer at 850° C.

A fuel gas was flown into the fuel gas passages in the fuel cell, an oxygen-containing gas was flown to the outer side of the cell, and the fuel cell was heated up to 850° C. in an electric furnace to conduct the generation testing. The generation characteristics during the testing were confirmed. After having generated the electricity for 500 hours, the fuel cell was taken out from the electric furnace to observe by eyes the peeling of the oxygen electrode layer from the reaction-preventing layer.

The results were as shown in Table 1.

TABLE 1

| | Inner layer of O₂ electrode layer | | | | | Surface layer of O₂ electrode layer | | | Generation | Peeling of |
| | LSCF | | SDC15 | | | | | | | |
| Sample NO. | Component | (Mass pts) | Component | (Mass pts) | Thickness (μm) | LSCF Composition | Thickness μm | Firing temp. ° C. | characteristics W/cm² | O₂ electrode after 500 hrs |
|---|---|---|---|---|---|---|---|---|---|---|
| *1 | 6464 | — | — | — | — | 6464 | 50 | 1050 | 0.39 | yes |
| *2 | 6464 | 100 | — | — | — | — | — | 1050 | 0.35 | yes |
| *3 | 6464 | 90 | SDC15 | 10 | 50 | — | — | 1050 | 0.39 | no |
| *4 | 6464 | 100 | — | — | — | 6464 | 50 | 1050 | 0.35 | yes |
| 5 | 6464 | 90 | SDC15 | 10 | 5 | 6464 | 50 | 1050 | 0.52 | no |
| 6 | 6464 | 90 | SDC15 | 10 | 10 | 6464 | 50 | 1000 | 0.48 | no |
| 7 | 6464 | 90 | SDC15 | 10 | 10 | 6464 | 50 | 1050 | 0.55 | no |
| 8 | 6464 | 90 | SDC15 | 10 | 10 | 6464 | 50 | 1100 | 0.49 | no |
| 9 | 6464 | 90 | SDC15 | 10 | 15 | 6464 | 50 | 1050 | 0.52 | no |
| 10 | 6464 | 90 | SDC15 | 10 | 20 | 6464 | 50 | 1050 | 0.45 | no |
| 11 | 6464 | 80 | SDC15 | 20 | 10 | 6464 | 50 | 1050 | 0.5 | no |
| 12 | 6464 | 70 | SDC15 | 30 | 10 | 6464 | 50 | 1050 | 0.45 | no |
| 13 | 6464 | 60 | SDC15 | 40 | 10 | 6464 | 50 | 1050 | 0.38 | no |
| 14 | 6446 | 90 | SDC15 | 10 | 10 | 6446 | 50 | 1050 | 0.52 | no |
| 15 | 6446 | 90 | SDC15 | 10 | 10 | 6446 | 50 | 1100 | 0.54 | no |
| 16 | 6428 | 90 | SDC15 | 10 | 10 | 6428 | 50 | 1100 | 0.53 | no |
| 17 | 6428 | 90 | SDC15 | 10 | 10 | 6428 | 50 | 1150 | 0.53 | no |
| 18 | 6464 | 90 | SDC15 | 10 | 10 | 6464/SDC15 = 90/10 | 50 | 1050 | 0.39 | no |

6428 → LaO. 6SrO. 4CoO. 2FeO. 803
6446 → LaO. 6SrO. 4CoO. 2FeO. 603
6464 → LaO. 6SrO. 4CoO. 2FeO. 403
Samples marked with * lie outside the scope of the invention.

In the sample No. 1 having a single oxygen electrode layer (without having the inner layer) as will be learned from Table 1 above, the reaction field is narrow for the surface diffusion and is dependent upon the volume diffusion in the surface layer. Therefore, the output density is low. In the samples Nos. 2 and 4 without containing the element diffusion-preventing oxide (SDC 15) in the inner layer of the oxygen electrode layer, the surface diffusion is small in the inner layer. Therefore, the number of reaction fields is small in the oxygen electrode layer and is not sufficient, producing a low output density. In the samples Nos. 1, 2 and 4 which don't contain SDC 15, further, the oxygen electrode layer had been partly peeled off the reaction-preventing layer after 500 hours generation.

In other samples having the oxygen electrode layer of the two-layer structure including the inner layer and the surface layer as contemplated by the present invention, a balance was maintained between the mechanism for sending oxygen ions to the reaction field by the volume diffusion in the surface layer and the mechanism for sending the air (oxygen) by the surface diffusion to the reaction field from the inner layer passing through voids in the surface layer. Therefore, a high output performance was exhibited. Besides, the junction strength was high between the oxygen electrode layer and the reaction-preventing layer, and the oxygen electrode layer was not peeled off.

The sample No. 18 containing the SDC 15 in the surface layer of the oxygen electrode layer exhibited a low output density.

The above samples were observed for their sectional surfaces to confirm the formation of fine ruggedness (pores) in the surfaces of the reaction-preventing layers (surfaces on the inner layer side of the oxygen electrode layers), particles of the inner layers entering into the rugged surfaces.

(Experiment 2)

In the following experiment, the number of contacts $n_1$ on the interface between the reaction-preventing layer and the oxygen electrode layer (inner layer) and the number of contacts $n_2$ between the inner layer and the surface layer of the oxygen electrode layer, were found by a method described below.

Measurement of the Numbers of Contacts:

The sample fuel cell was cut at three different places in the longitudinal direction, and the numbers of contacts $n_1$, $n_2$ were found as average values on the predetermined interfaces on the cut surfaces (10 μm) by using an electron microscope.

The thickness was measured in a range of measuring the numbers of contacts on the above sectional surfaces by using an electron microscope, and a maximum thickness was regarded to be a thickness of the inner layer and of the surface layer.

The inner layer-forming material and the surface layer-forming material of the oxygen electrode layer were as follows:

Inner Layer-Forming Material:
  A mixture of an $La_{0.6}Sr_{0.4}Co_{0.8}Fe_{0.2}O_3$ powder and a $(ceO_2)_{85}(SmO_{3/2})_{15}$ powder (also called SDC 15) DSC 15 content: 10 mass % (in the mixed powder) Particle size distribution of the mixed powder:
  Average particle size ($D_{50}$): 0.6 μm
  Content of coarse particles (particle size of not smaller than 1.2 μm): not larger than 5% by weight Content of fine particles (particle size of not larger than 0.3 μm): not larger than 3% by weight Surface Layer-Forming Material:
  $La_{0.6}Sr_{0.4}Co_{0.8}Fe_{0.2}O_3$ powder
  Average particle size ($D_{50}$): 0.8 μm Content of coarse particles (particle size of not smaller than 1.2 μm): not larger than 5% by weight Content of fine particles (particle size of not larger than 0.3 μm): not larger than 3% by weight First, a support substrate-forming material was prepared in quite the same manner as in Experiment 1, and a coated layer was formed on the support substrate-forming article for forming a fuel electrode layer.

Next, by using a slurry obtained by mixing a $ZrO_2$ powder in which scandium has been solidly dissolved in an amount of 10 mol %, an organic binder and a solvent, a sheet was formed maintaining a thickness of 40 μm by the doctor blade method for forming a solid electrolytic layer, and the coated layer for forming the fuel electrode layer on the support substrate-forming article was stuck thereto followed by drying. The obtained laminated article was calcined at 1000° C.

Further, to the DSC 15 powder (oxide powder for preventing the diffusion of elements) having a degree of aggregation of 13 to 16 prepared in the same manner as in Experiment 1 were mixed an acrylic binder and toluene to prepare a slurry thereof which was, then, applied by the screen-printing method, onto the surface of the solid electrolyte-forming sheet of the above calcined laminated article to prepare a reaction preventing layer-forming article.

Further, a slurry was prepared by mixing an $LaCrO_3$ oxide (interconnector-forming material), an organic binder and a solvent, laminated on the exposed portion of the support substrate-forming article of the above calcined laminated article, and was fired in an oxygen-containing atmosphere at a firing temperature of 1485° C. to obtain a sintered laminate.

In the sintered laminate that was obtained, the support substrate possessed a thickness of 3 mm and an open porosity of 35%, the fuel electrode layer possessed a thickness of 10 μm and an open porosity of 24%, the solid electrolytic layer possessed a thickness of 30 μm and a relative density of 97%, and the reaction-preventing layer possessed a thickness of 5 μm.

Next, a coating solution obtained by mixing a powder of the inner layer-forming material and an isopropyl alcohol was applied by spraying while varying the spraying conditions (solvent concentration of the coating solution, spraying pressure, spraying distance) and varying the thickness to form a coated layer for forming the inner layer of the oxygen electrode layer, followed by drying at 120° C. Further, a coating solution obtained by mixing a powder of the surface layer-forming material and an isopropyl alcohol was applied by spraying while varying the spraying conditions (solvent concentration of the coating solution, spraying pressure, spraying distance) and varying the thickness to form a coated layer for forming the surface layer of the oxygen electrode layer, followed by drying at 120° C. and, further, by firing at 1050° C. to form a two-layered oxygen electrode layer thereby to prepare fuel cells (samples Nos. 1 to 15). The prepared fuel cells measured 25 mm×140 mm.

A hydrogen gas was flown into the fuel cell prepared as described above to reduce the support substrate and the fuel electrode layer at 850° C. Then, a fuel gas was flown into the fuel gas passages in the fuel cell, an oxygen-containing gas was flown to the outer side of the cell, and the fuel cell was heated up to 750° C. in an electric furnace to conduct the generation testing. The generation performance (output density) during the testing is shown in Table 2 together with the numbers of contacts $n_1$, $n_2$, thicknesses $L_1$, $L_2$ of the inner layer and of the surface layer, function indexes $W_1$, $W_2$ of the inner layer and of the surface layer, and the function index W of the electrode.

TABLE 2

| Sample No. | Number of contacts $n_1$ | Thickness $L_1$ | Electrode function index $W_1$ | Number of contacts $n_2$ | Thickness $L_2$ | Electrode function index $W_2$ | Electrode function index W | Output density W/cm² |
|---|---|---|---|---|---|---|---|---|
| 1 | 10 | 10 | 100 | 7 | 57 | 399 | 499 | 0.62 |
| 2 | 10 | 5 | 50 | 7 | 57 | 399 | 449 | 0.65 |
| 3 | 10 | 5 | 50 | 7 | 64 | 448 | 498 | 0.45 |
| 4 | 10 | 5 | 50 | 7 | 78 | 546 | 596 | 0.29 |
| 5 | 10 | 7 | 70 | 7 | 57 | 399 | 469 | 0.66 |
| 6 | 10 | 10 | 100 | 5 | 100 | 500 | 600 | 0.29 |
| 7 | 10 | 20 | 200 | 5 | 60 | 300 | 500 | 0.54 |
| 8 | 10 | 30 | 300 | 5 | 40 | 200 | 500 | 0.51 |
| 9 | 10 | 30 | 300 | 5 | 20 | 100 | 400 | 0.28 |
| 10 | 15 | 10 | 150 | 10 | 30 | 300 | 450 | 0.54 |
| 11 | 15 | 7 | 105 | 5 | 70 | 350 | 455 | 0.66 |
| 12 | 15 | 4 | 60 | 7 | 50 | 350 | 410 | 0.68 |
| 13 | 7 | 21 | 147 | 10 | 30 | 300 | 447 | 0.28 |
| 14 | 7 | 21 | 147 | 5 | 70 | 350 | 497 | 0.53 |
| 15 | 20 | 5 | 100 | 7 | 40 | 280 | 380 | 0.62 |

From Table 2, the samples Nos. 4 and 6 (having a small number of contacts $n_2$ on the surface layer and having a large thickness $L_2$) with a function index of not smaller than 500 have poor generation performance. Since the thickness $L_2$ of the surface layer is large in contrast with the small number of contacts $n_2$ between the surface layer and the inner layer, migration of the adsorbed oxygen is controlled due to the distance up to the inner layer despite oxygen ions are permitted to be carried by the surface diffusion.

In the sample No. 9 having the inner layer of a large thickness, migration of the adsorbed oxygen carried by the surface layer is controlled in the dense inner layer, and generation performance (output density) is poor.

In the sample No. 13 in which the numbers of contacts are reversed (surface layer is more dense than the inner layer), the reaction field occurring on the interface to the electrolyte is narrow for the adsorbed oxygen sent from the surface layer. Therefore, the reaction field is not efficiently utilized, and the generation performance decreases.

In other samples, on the other hand, the electrode function indexes W expressed by the above formula (1) are in a range of 300 to 500. Owing to a balance between the numbers of contacts and the thickness, therefore, a good balance is maintained between the surface diffusion and the volume diffusion, and high outputs are obtained.

The invention claimed is:

1. A solid electrolytic fuel cell having an oxygen electrode layer on one surface of a solid electrolytic layer, having a fuel electrode layer on the other surface of the solid electrolytic layer, and having a reaction-preventing layer comprising a sintered body of an oxide between the solid electrolytic layer and the oxygen electrode layer for preventing elements from diffusing from the oxygen electrode layer into the solid electrolytic layer, wherein:

the oxygen electrode layer has a two-layer structure including an inner layer on the side of the reaction-preventing layer and a surface layer on the inner layer;

the surface layer of the oxygen electrode layer comprises a sintered body of a perovskite composite oxide; and the inner layer of the oxygen electrode layer comprises a sintered body of a mixture of particles of an oxide for preventing the diffusion of elements and particles of the peroviskite composite oxide, and is formed more densely than said surface layer, wherein the inner layer of the oxygen electrode layer contains 10 to 30 mass % of the oxide for preventing the diffusion of elements and contains 70 to 90 mass % of the perovskite composite oxide, wherein said oxide for preventing the diffusion of elements is not present in said surface layer of the oxygen electrode.

2. A solid electrolytic fuel cell according to claim 1, wherein the oxide for preventing the diffusion of elements is an oxide containing Ce as a constituent element.

3. A solid electrolytic fuel cell according to claim 2, wherein the oxide for preventing the diffusion of elements is a Ce composite oxide in which $SmO_3$ is solidly dissolved in $CeO_2$.

4. A solid electrolytic fuel cell according to claim 3, wherein the Ce composite oxide has a molar composition represented by the following general formula:

$(CeO_2)_{1-x}(SmO_{2/3})_x$ wherein x is a number of $0 < x \leq 0.3$.

5. A solid electrolytic fuel cell according to claim 1, wherein the perovskite composite oxide is an $(La, Sr)(Co, Fe)O_3$ oxide.

6. A solid electrolytic fuel cell according to claim 1, wherein the inner layer of the oxygen electrode layer is formed having a thickness smaller than that of the surface layer.

7. A solid electrolytic fuel cell according to claim 6, wherein when the thickness of the inner layer is denoted by $L_1$ and the thickness of the surface layer by $L_2$, the inner layer and the surface layer of the oxygen electrode layer are so formed that an electrode function index W defined by the following formula (1):

$$W = W_1 + W_2 \qquad (1)$$

wherein $W_1$ is an index expressed by $n_1 \cdot L_1$, $W_2$ is an index expressed by $n_2 \cdot L_2$, $n_1$ is a number of contacts per a unit length (10 μm) on the interface between the inner layer and the reaction—preventing layer, and $n_2$ is a number of contacts per a unit length (10 μm) on the interface between the inner layer and the surface layer, is 300 to 500.

8. A fuel cell assembly fabricated by containing, in a container, cell stacks obtained by electrically connecting in series a plurality of the solid electrolytic fuel cells of claim 1.

* * * * *